June 28, 1960 A. C. VOS 2,942,320
CASE SHAPED MOULD DEVISED FOR THE MANUFACTURE OF BODIES
FROM CONCRETE OR SUCHLIKE DISCHARGE MATERIAL
Filed May 13, 1958
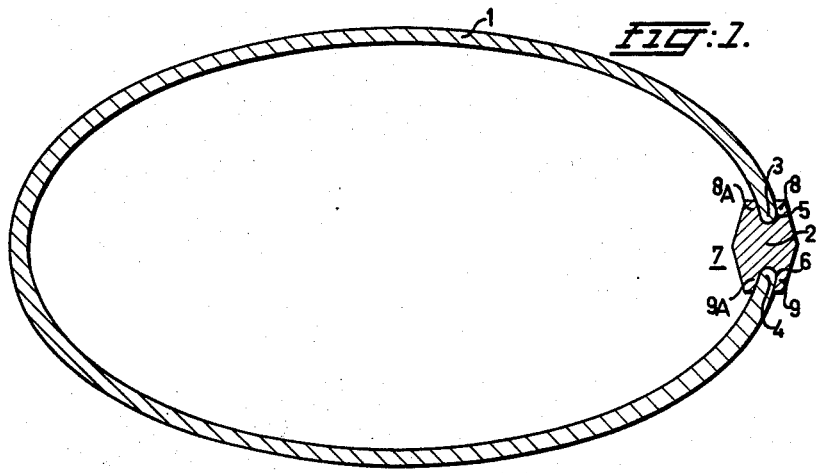
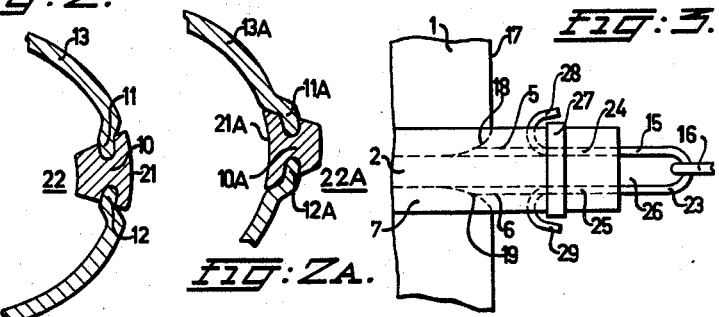
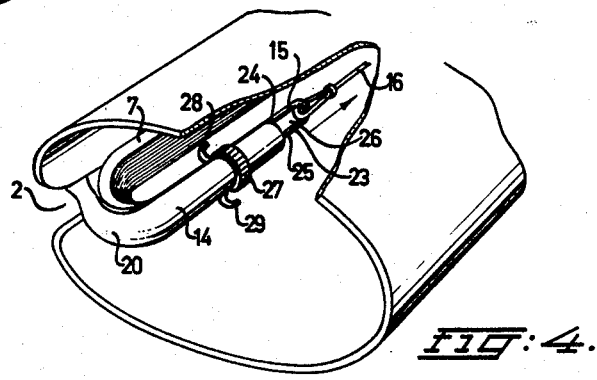
INVENTOR.
ALBERT C. VOS
BY
ATTORNEY United States Patent Office 2,942,320
Patented June 28, 1960

2,942,320

CASE SHAPED MOULD DEVISED FOR THE MANUFACTURE OF BODIES FROM CONCRETE OR SUCH LIKE DISCHARGE MATERIAL

Albert Cornelis Vos, Epe, Netherlands, assignor to N. V. Schokbeton, Zeist, Netherlands, a limited liability company of the Netherlands Filed May 13, 1958, Ser. No. 734,877

Claims priority, application Netherlands May 18, 1957

5 Claims. (Cl. 25—118)

This invention relates to a tubular mould, suitable for moulding a channel in a body for shaping a body consisting of concrete or any other material hardening from the liquid or viscous state within or on the mould.

Tubular moulds of this kind are used e.g. for so called hollow beams.

Rather complicated constructions have already been proposed in order to remove an inside mould or core by reducing the diameter of the inside mould after the formation of the hollow body with a cavity housing an open exit for the mould.

It has already been proposed to provide for this purpose inflatable cores, comprising inflatable tubes located between metal end plates, which are connected together by strips of rubberized cotton or other flexible fabric forming part of the outer covers of the inflatable tubes. After repeated use of such cores these fabric strips become strained and distorted owing to the stretching to which they are subjected, so that costs of maintenance are high and these constructions are expensive and complicated.

Moreover they cause trouble because dust and concrete particles or the like enter between connecting links and these parts have to be cleaned frequently.

It is an object of the invention to provide a mould having the least possible parts and being removable in such a simple way that no damage is caused to the moulded body even when it is not yet fully hardened.

The possibility of removing the mould prior to the complete hardening of the moulded body is of great importance because it reduces the number of moulds required for a certain rate of production.

It is a further object of the invention to avoid the necessity of exerting great forces when removing an element from a slit in a tubular mould and to achieve a reduction of the space required for this removal.

Other objects of this invention and the manner an which they are obtained will appear in the following detailed description of illustrative embodiments.

According to a main principle of this invention the tubular mould has at least one slit substantially extending in the direction of the longitudinal axis of the mould along the length of the latter, said slit being adapted to be expanded and contracted by the insertion and removal of a strip-shaped element having rabbeted or grooved longitudinal edges adapted to receive the edges of the mould along the slit. The strip-shaped element is made of an elastic and flexible material and is adapted to be clamped in the slit and to be removed out of the slit by progressively bending the strip out of the slit starting at one end of the latter. The strip has a simple profile and has substantially the same cross-section along its entire length.

The invention further provides a method for moulding a channel or shaping a body of concrete or any other plastically hardening material by means of a mould, as described hereinbefore, with the strip being located in the slit of the mould pouring of the concrete or the like, while after complete or partial hardening of the material, the strip is lifted out by bending it from the slit, whereupon the mould is removed.

The invention is hereinafter described with reference to the drawing which shows some embodiments thereof.

Figure 1 is a cross section of a mould according to the invention.

Figure 2 is a partial cross section of a modified embodiment of an inside mould or core.

Figure 2A is a partial cross section of a modified embodiment of an outside mould.

Figure 3 is a partial side elevation of one of the extremities of the mould.

Figure 4 is a perspective view, which is partly broken away and shows the way in which the strip is removed.

Referring to the drawing in detail, and initially to Fig. 1 thereof, it will be seen that the illustrated tubular mould 1 is formed with a longitudinal slit 2 which extends along the entire length of the mould. The mould, particularly if only one slit is provides, ought to be capable of elastic deformation for the purpose of decreasing or increasing the diametrical dimensions of the mould, and the surface may not adhere to the material to be moulded, for example, concrete. To that end the mould is composed of a rather hard substance, such as, metal, wood, cardboard or the like, provided with a covering layer of an organic plastic which does not adhere to the moulded material, such as, for example, nylon, aculon, polystyrene, polyvinylchloride, acrylic resins or mixtures thereof or plastic base lacquers, or the mould may be made entirely of such plastic. The edges 3 and 4 of the mould defining the margins of the slit are rounded off and fit into oppositely opening grooves 5 and 6 provided with rounded bottoms in an elastic strip 7, e.g. made of rubber. The strip 7 normally fills the slit 2 and the normal lateral distance between the bottoms of grooves 5 and 6 is greater than the normal width of slit 2 as that the strip is pressed in the slit thanks to the elasticity of the mould and also thanks to the elasticity of the rubber of the strip which is thereby clamped. The parts of the strip situated inside and outside the mould have a flattened shape and are reduced in thickness towards the edges 8, 8A, 9 and 9A, so that the removal of the strip becomes easier, but at the same time the formation of a deep groove in the body to be manufactured is prevented.

In the embodiment represented in Fig. 2, the formation of a groove in the moulded body is more completely avoided, as the edges 11 and 12 of the slit 10 in the inside mould 13 are bent inward. Conversely, in the outside mould of Fig. 2A, the edges 11A and 12A of the slit 10A in the outside mould are bent outward with respect to the other part of the mould. Thus, the side 21 or 21A of the strip 22 or 22A which faces toward the body to be moulded does not protrude beyond the wall surface of the mould 13 or 13a.

After disposition of the strip 7 in the slit 2 of the mould the latter is ready for use. The strip is easily disposed in the slit, and a further advantage of the described arrangement is that often commercial profiles provided for other purposes will be suitable for the strip 7, which profiles are obtainable at an advantageous price.

After pouring of the concrete and the complete or partial hardening thereof the strip 7 is removed. In case the mould 1 is an inside mould or core this is done by providing an extremity of the strip (see Figs. 3 and 4), with a fastening element 15. This fastening element consists of a U-shaped bar 23 having parallel parts 24 and 25 inserted in the grooves 5 and 6 of the strip 7, thus forming an eye 26. The parallel parts 24 and 25 are clamped in the grooves 5 and 6 by means of a hose clip 27, in order to prevent removal of the parts 24 and 25 from the grooves 5 and 6, they are provided with bent extremities 28 and 29 which are situated behind the clip 27. The eye 26 is engaged by hauling means 16, as for instance a wire, a bar or the like, which, following the positioning of the strip 7 in slit 2, is conducted parallelly to the strip and through the mould, whereas the free end of the hauling means stays outside of the mould. In order to remove the strip the hauling means is pulled in the direction of the arrow in Fig. 4, that is, in the direction away from the end having the element 15, so that the strip 7 is bent from the slit, and is progressively bent round through an angle of 180° as indicated at 20. Thus, the strip is removed through the interior of the mould. An outside mould can be handled in an analogous way. In that case the strip however is bent to the outside of the mould.

In order to facilitate the described removal of the strip 7, the slit 2 broadens near to the extremity 17 of the mould, where rounded corners 18 and 19 are provided at the ends of edges 3 and 4 (Fig. 3). The rounding of the edges 3 and 4 of the slit 2 and the corresponding curvatures of the grooves 5 and 6 of the strip 7 and the reduction of the thickness of the portions of the strip located inside and outside the mould towards the edges 8, 8A, 9 and 9A facilitate the bending of the strip out of the slit, and wearing of the strip is minimized.

The material of the strip must be sufficiently elastic and may for instance consist of rubber or a rubberlike plastic.

As a result of the stretching of the side of the strip facing the moulded body when the strip is bent for removal from the slit, no concrete will adhere to the strip, so that cleaning of the strip is not necessary. Also the penetration of concrete and similar impurities through the slit is prevented by the sealing action of the strip.

After taking away the strip, the elastically deformable mould can be easily removed, even when only one slit is provided in the mould. The mould, however, may also be composed of several parts connected by strips, whereby, after removal of the strips, the individual parts of the mould can be separately removed from the cavity of the moulded body.

It is further to be noted that, with such a mould, all kinds of elements, in particular building elements, can be formed with cavities which, at least at one end, open to the outside.

Having thus described my invention what I claim as new and desire to secure by Letters Patent is:

1. A mould comprising a tubular shell having inner and outer surfaces and at least one slit extending in the direction of the longitudinal axis of the shell and being longitudinally coextensive with the latter, one of said surfaces of the shell defining a surface of an article to be moulded, said shell having longitudinal edges defining the opposite margins of said slit and being movable toward and way from each other to vary the cross-sectional configuration of the shell and thereby separate said one surface of the mould from the corresponding surface of the moulded article, an elongated spacing member of elastic and flexible material normally disposed in said slit along the length of the latter and having longitudinal grooves opening in opposite directions away from each other and receiving said longitudinal edges of the shell, and hauling means connected to one end of said spacing member and extending at an angle with respect to the longitudinal axis of said slit at the side of the latter facing in the direction of the other of said surfaces of the shell so that a pull exerted on said hauling means bends said spacing member progressively out of said slit for removal from the latter.

2. A mould as in claim 1; wherein said one surface of the shell is the outer surface of the latter, and said hauling means extends through said shell from said one end of the spacing member in the direction toward the opposite end of the spacing member so that a pull exerted on said hauling means bends said spacing member through 180 degrees for removal through the interior of the shell.

3. A mould as in claim 1; wherein said hauling means lies in a plane containing the longitudinal axes of said shell and of said slit.

4. A mould as in claim 3; wherein said spacing member has a uniform cross-sectional configuration along substantially the entire length thereof.

5. A mould as in claim 4; wherein said shell has rounded corners at the ends of said longitudinal edges which are adjacent said one end of the spacing member to facilitate the initial bending of the latter out of said slit.

References Cited in the file of this patent

UNITED STATES PATENTS

| 150,333 | Leverty | Apr. 28, 1874 |
| 211,241 | Koch et al. | Jan. 7, 1879 |
| 823,963 | McNamire | June 19, 1906 |
| 1,503,358 | Evans | July 29, 1924 |

FOREIGN PATENTS

| 961,253 | France | Nov. 14, 1949 |
| 263,489 | Great Britain | Aug. 18, 1927 |